United States Patent [19]

Stevens

[11] 4,127,341
[45] Nov. 28, 1978

[54] ADJUSTABLE DEFLECTION LIMITING ELEMENT FOR TRAILING ARM ASSEMBLY

[75] Inventor: G. Wesley Stevens, Regina, Canada

[73] Assignee: Degelman Industries Ltd., Regina, Canada

[21] Appl. No.: 849,866

[22] Filed: Nov. 9, 1977

[51] Int. Cl.² ............................................. A01B 61/04
[52] U.S. Cl. .................................... 403/113; 172/621; 403/120
[58] Field of Search ................. 403/113, 117, 120, 91; 56/400.2; 172/265, 266, 620, 621, 624

[56] References Cited

U.S. PATENT DOCUMENTS

| 1,629,041 | 5/1927 | Minier | 403/120 |
|---|---|---|---|
| 3,321,027 | 5/1967 | Johnson et al. | 172/266 |
| 3,565,180 | 8/1965 | Arnold | 172/265 |
| 3,606,928 | 9/1971 | Quanbeck | 172/265 |
| 3,981,367 | 9/1976 | Mydels | 172/265 |

Primary Examiner—Andrew V. Kundrat
Attorney, Agent, or Firm—Barrigar & Company

[57] ABSTRACT

For use in a trailing arm assembly having a support frame and a spring-loaded trailing arm pivotally mounted on the support frame, an adjustable stop element is provided for limiting the downward deflection of the trailing arm. The stop element is a rotatable eccentrically mounted element having a polygonal cross section, the surfaces around the polygon adjustably engaging the underside of the trailing arm, thereby adjustably limiting the downward deflection of the trailing arm. The deflection limiting element may conveniently be in the form of a rectangular parallelepiped eccentrically mounted between two guide plates which provide lateral support for the trailing arm.

5 Claims, 8 Drawing Figures

ADJUSTABLE DEFLECTION LIMITING ELEMENT FOR TRAILING ARM ASSEMBLY

BACKGROUND OF THE INVENTION

The present invention relates to an adjustable deflection limiting mechanism in a spring tine harrow trailing arm or drag arm assembly for use, for example, as an agricultural implement to prepare seedbeds.

It is usual in preparing soil for seeding to drag over the land by means of a tractor or other vehicle, a set of farm implements in tandem such as an assembly of disks followed by an assembly of spring tine harrows. The purpose of the harrow is to break up large clumps of soil and to level the ground. Conventionally, spring time harrows are comprised of a series of spring loaded teeth or tines mounted on a set of transverse parallel bars with the bars being fixed relative to one another by suitably spaced cross-members clamped or welded to the bars. The resultant assembly of tines is attached by one or more drag arms to a disk, plough, cultivator or other similar unit that operates ahead of and in tandem with the harrow.

Many conventional units have either had no facility for adjusting the downward deflection limit of the tines or for moving the tines into a position in which they are easily transportable, or else have had inconvenient, complicated or non-positive arrangements for such adjustments.

A further problem with many known sprng tine harrow units is their complexity of manufacture, requiring several components of unusual shapes or a relatively large number of components or components of unduly large size of shape, adding unnecessarily to the cost of manufacture and consequently complicating the overall design of the harrow.

SUMMARY OF THE INVENTION

It is an object of the invention to provide a drag arm mounting assembly from which to pivotally suspend the drag arm so that the latter is stabilized against lateral movement, which incorporates a simple, positive, easily operated height positioning adjustment for the drag arm and provides a simple means of anchoring one end of the tension spring used to restrain upward pivotal movement of the assembly.

It is a further object to provide a positive non-slip means for clamping the drag arm to the frame supporting the spring tines which also permits lateral adjustment of the spring tines.

To this end, the present invention provides, in a trailing arm assembly having a support frame and a spring-loaded trailing arm pivotally mounted thereon, the improvement comprising an adjustable stop element for limiting the downward pivotal movement of the trailing arm, said stop element being rotatably transversely mounted on the support frame underneath the trailing arm and having an axis of rotation generally parallel to the pivotal axis of the trailing arm, the stop element having a plurality of abutment surfaces at varying distances from the axis of rotation thereof engageable with the underside of the trailing arm, the stop element being adjustably rotatable and fastenable to the support frame to present any selected one of said abutment surfaces to the trailing arm.

In a preferred embodiment, a set of spring tines is suspended from a frame made up of a number of transverse substantially horizontal, substantially parallel bars interconnected by suitable spaced rigidly attached cross-members. The cross-members in turn, are welded to a transverse section of pipe. A set of U-bolts embrace the transverse section of pipe and clamped between it and a flat plate attached to the drag arm is a short section of formed channel with the interior portion of the channel facing the pipe such that when the U-bolts are tightened the sides of the channel bites into the transverse section of pipe providing thereby a secure connection between the drag arm and the frame supporting the tines from which the spring tine assembly is supported is a rigid member pivotally connected at its front end from a mounting support in the form of a pair of flat plates called balance plates lying in a vertical plane and sandwiching the vertical sides of the drag arm for a portion thereof extending in a rearwardly direction from the drag arm's pivotal axis so as to prevent lateral movement of the drag arm.

Also sandwiched between the balance plates of the mounting support and supported by a bolt passing through these plates in a transverse direction is a short bar, rectangular in cross-section, and eccentrically mounted on an axis which is below the pivotal axis of the drag arm and offset from it in a rearwardly direction. This bar or adjustment block functions as a stop element or deflection limiting device — it operates as a cam to limit adjustably the downward deflection of the drag arm. By rotating the adjustment block or cam on its axis the distance between the block's axis of rotation and the side of the block in contact with the drag arm is varied so as to adjust the maximum downward deflection of the drag arm.

Also mounted between the balance plates of the mounting support, below the pivotal axis of the drag arm and offset in a rearwardly direction is a tension spring anchor point. The other end of the tension spring is fastened to the underside of the drag arm. The minimum deflection of the tension spring so mounted is obtained when its axis if projected would pass through the pivotal axis of the drag arm. Considering the relative locations of the pivotal axis of the drag arm and the anchor point of the tension spring this occurs when the drag arm has a downward deflection. Mounted in this way, the change in spring deflection and hence the rate of increase of tension with deflection of the drag arm is not constant or nearly so but decreases significantly for increasing upward deflections of the drag arm. Consequently large upward deflections of the drag arm are not accompanied by unduly large downward pressures on the drag arm and spring tines. The forward end of the balance plates of the mounting support are flanged to provide a surface for mounting the plates to a transverse beam element located either on another implement operating forwardly of the harrow, or on the rearward end of a tractor or other farm vehicle.

DETAILED DESCRIPTION OF PREFERRED EMBODIMENT WITH REFERENCE TO DRAWINGS

The preferred embodiment to be described is a spring tine harrow implement for breaking down clods of soil and levelling the ground in preparation for seeding. However, this description is not to be taken as limiting the trailing arm assembly invention, as the invention would obviously have application to other situations in which a mechanism such as a disk or other device is attached to the end of a drag arm from which it receives a steady down pressure but is capable of deflecting upwards when encountering large obstacles, and subsequently returning to its normal operating position in response to the return force exerted by a spring on the drag arm and in which a simple, convenient, positive means of adjusting the maximum downward deflection of the drag arm is desired.

Figure 1:
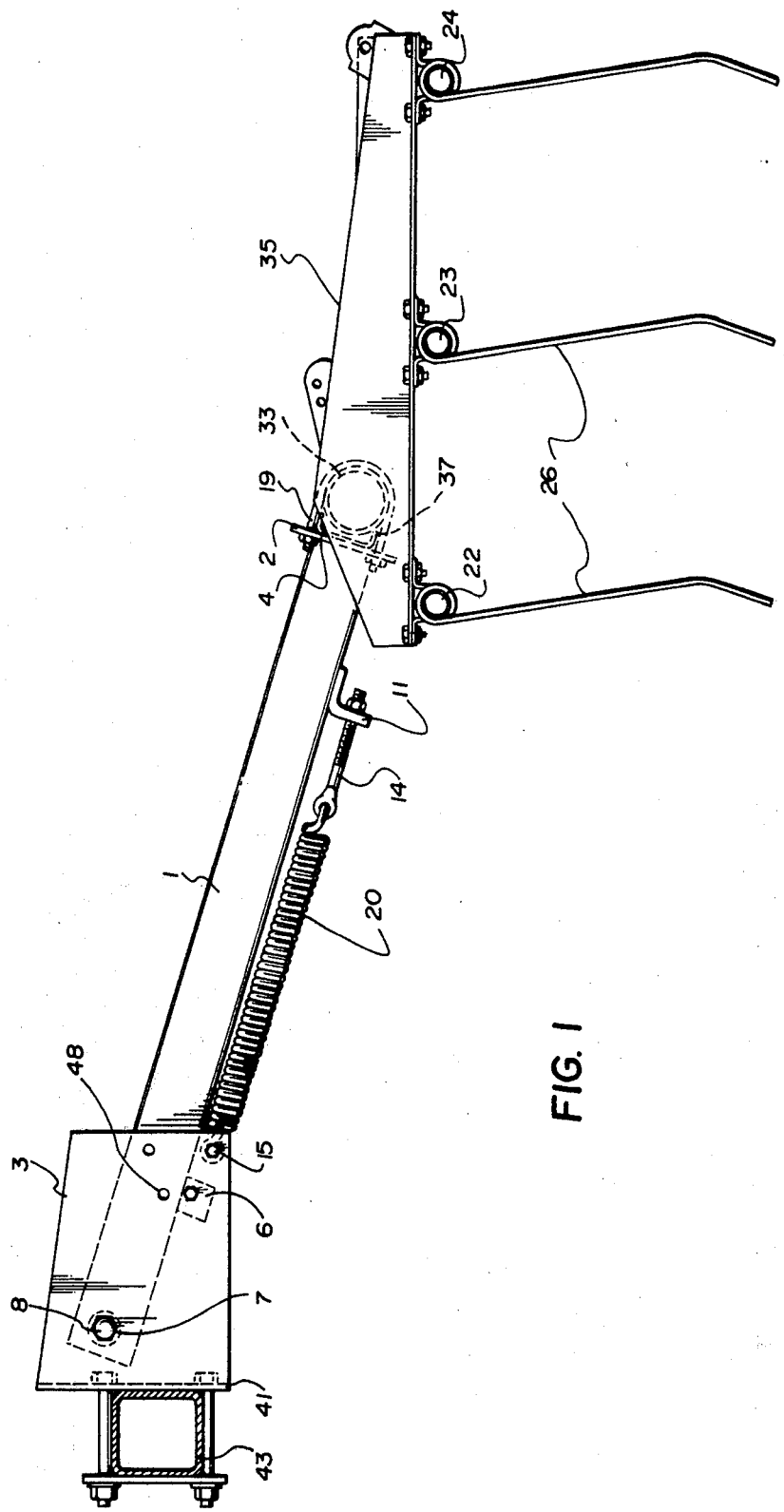
FIG. 1 is a side elevation view of a preferred embodiment of a spring tine harrow (including trailing arm) assembly in accordance with the present invention.
Figure 2:
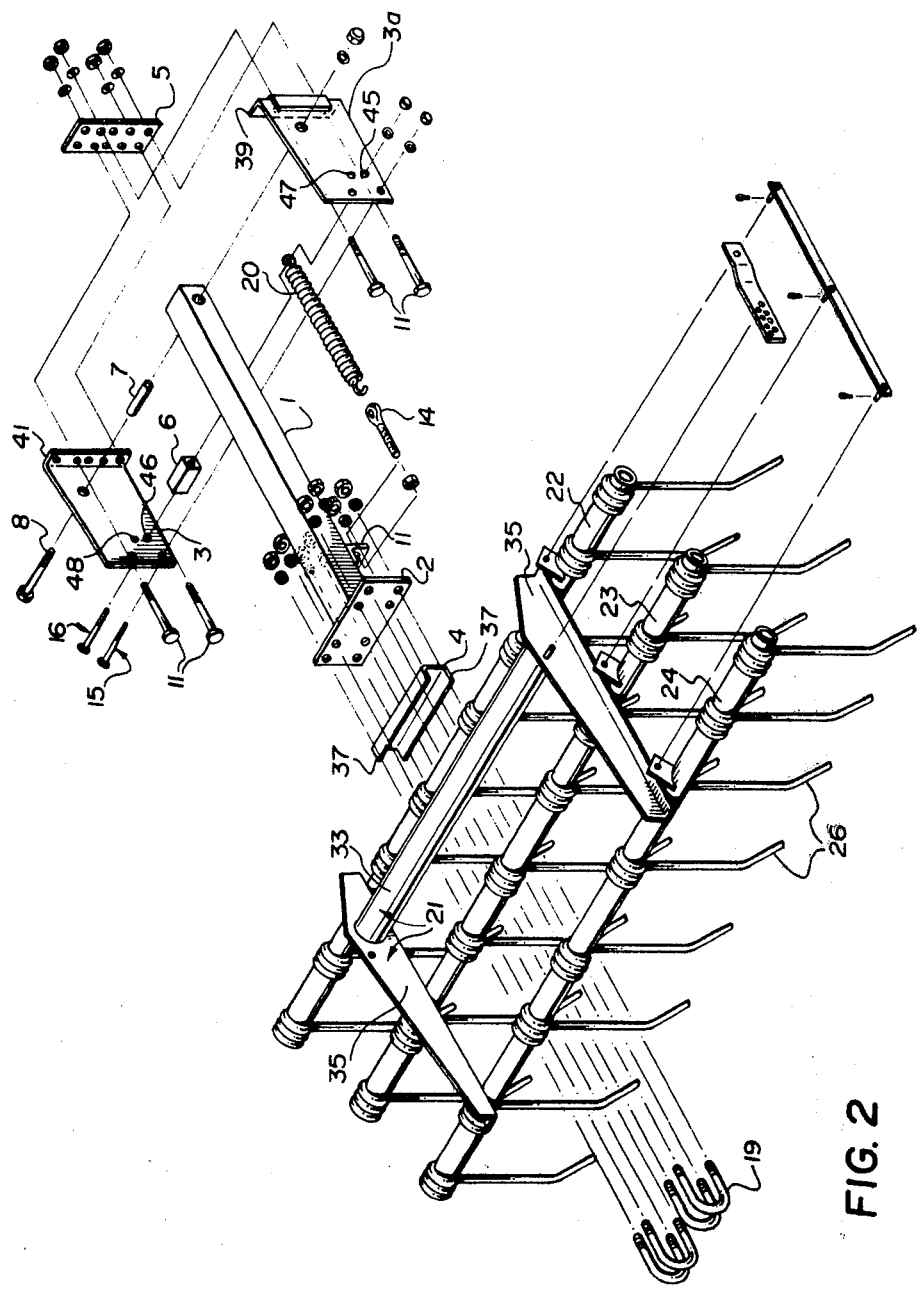
FIG. 2 is an exploded perspective view of the components forming the assembly of FIG. 1.

Referring to FIGS. 1 and 2, a spring tine harrow attachment (including drag arm assembly) includes a number of spring tines 26, suspended from a number of lateral, substantially horizontal, substantially parallel beam elements 22, 23 and 24, held in place by a rigidly attached frame assembly 21 comprising transverse bar or pipe 33 and parallel spaced side arms 35. Embracing the transverse bar 33 are a number of U-clamps 19 which are bolted to a plate 2 which is welded to the rearmost end of a drag arm 1. Between the plate 2 and the transverse bar is a channel element 4 whose flanged edges 37 bite into bar 33 when the U-clamps 19 are tightened, thereby tightly gripping bar 33. It will be noted that the frame 21 can be adjusted transversely relative to drag arm 1 when U-clamps 19 are loosened.

The drag arm 1 is pivotally mounted on a transverse bushing 7, which is sandwiched between a balance plate assembly consisting of two substantially parallel vertical plates 3 and 3A, said bushing being supported by a bolt 8, which passes through the plates and bushing. The plates 3, 3A also extend in a rearwardly direction from the pivotal axis of the drag arm, a short distance over which they are closely spaced from (and thereby constrain the lateral movement of) the vertical sides of the drag arm.

A bolt 15 which passes in a transverse direction through the plates 3, 3a below the level of the pivotal axis of the drag arm and offset from the latter in a rearwardly direction provides a convenient means for anchoring one end of a spring 20 normally under tension, the other end of which is connected to an eye bolt 14 mounted on a bracket 11 welded to the underside of the drag arm.

A bolt 16, also passing in a transverse direction through the balance plates 3, 3a, passes through an adjusting block or deflection limiting cam 6, on the axis whose distance to any one of the four abutment surfaces of the cam engageable with drag arm 1 is different from that to any other side. The adjusting block 6 itself is sandwiched between the plates of the balance plate assembly and is positioned below the drag arm offset in a direction rearwardly of the pivotal axis of the drag arm (but forwardly of spring anchoring bolt 15).

The forward ends 39, 41 of the balance plates 2 and 3 are flanged so as to provide a convenient mounting surface in combination with a mating forwardly positioned clamping plate 5. A transverse beam 43 of an implement frame is sandwiched between plate 5 and flanges 39, 41 bolted to plate 5 above and below the beam 43. (As an alternative construction, plates 3, 3A could be formed as an integral U-shaped plate, with flanges 39 and 41 forming an integral surface.)

Figure 3:
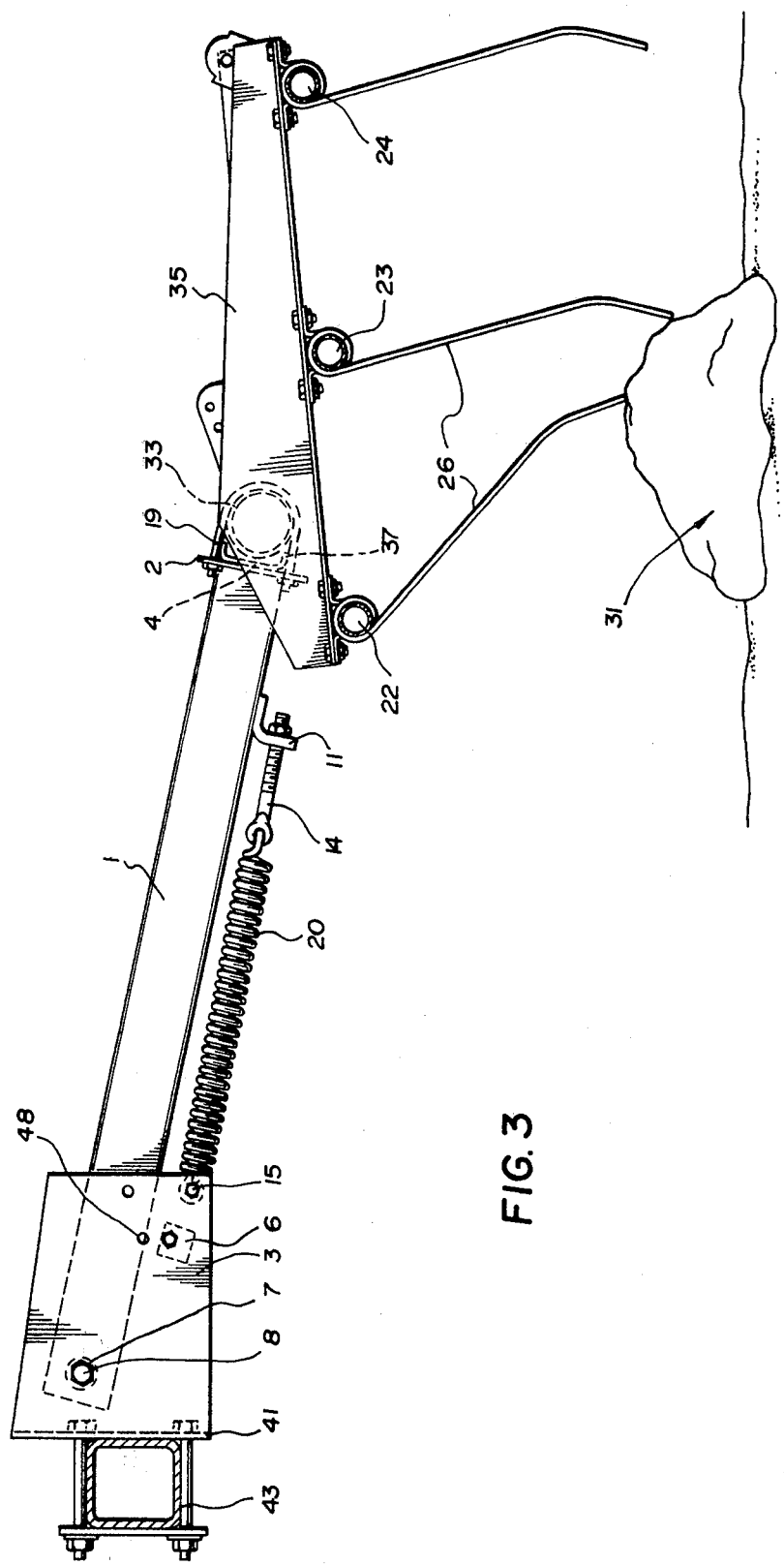
FIG. 3 is a side elevation view of the spring tine harrow assembly of FIG. 1 shown being pulled over a large obstacle, showing the drag arm and drag arm tensioning spring deflected upwards so as to portray the relative positioning of the deflection limiting cam, drag arm tensioning spring and drag arm.

FIG. 3 illustrates the upward pivotal deflection of the drag arm 1 and tensioning spring 20 when the harrow has encountered an unusually large object such as rock 31, during operating. Note that a relatively large upward deflection of the drag arm 1 can be accommodated without any limit imposed by the spring 20, which extends longitudinally relatively little for a relatively large upward deflection of drag arm 1.

Figure 4B:
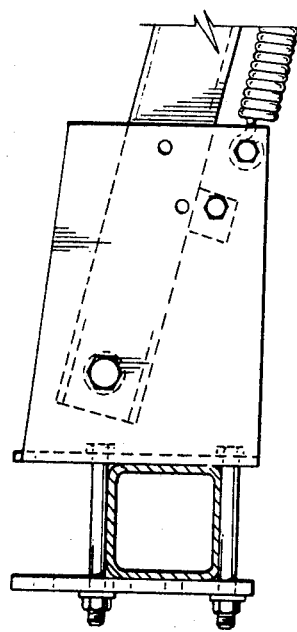
FIGS. 4a, 4b, 4c, and 4d are side elevational views of the drag arm mounting support assembly showing different positions of the height positioning cam or adjustment block.
Figure 4D:
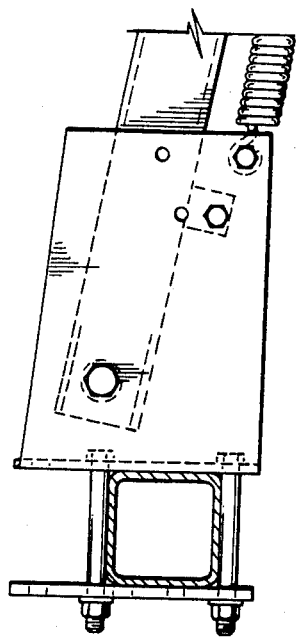
Figure 4A:
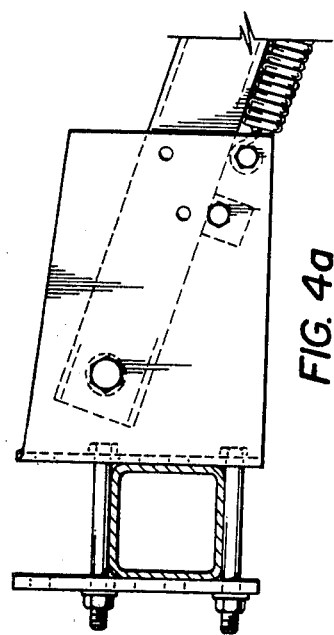
Figure 4C:
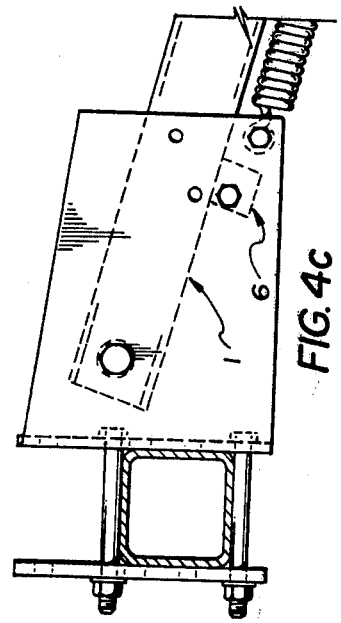

The adjusting block 6 is shown on FIG. 4(a) in a position which provides for the maximum permitted downward deflection of the drag arm 1. The cam 6 is shown on FIGS. 4(b), (c) and (d) in positions which provide for progressively higher limit levels of permitted downward deflection of the drag arm 1. (In other words, the lowermost permitted position of drag arm 1 is lowest in FIG. 4(a) and is highest in FIG. 4(d), for the cam mounting illustrated.)

Figure 5:
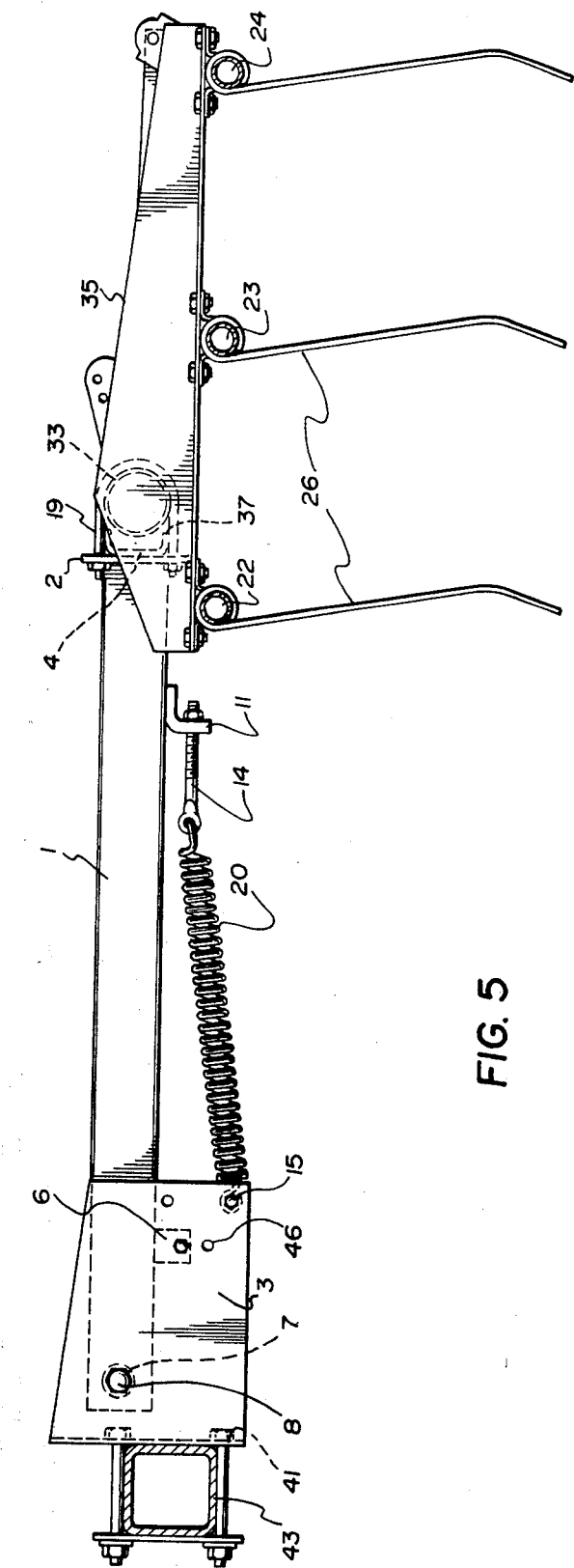
FIG. 5 is a side elevation view of the spring tine harrow assembly of FIG. 1, showing the drag arm in transport position mode.

The bolt 16 supporting cam 6 may also be mounted, instead of through lower holes 45, 46 in plates 2 and 3 as seen in FIGS. 1, 3 and 4, alternatively through upper holes 47, 48 in these plates. This alternative mounting, illustrated in FIG. 5, permits the drag arm 1, during transportation to the field, to be carried in a position where the spring tines do not engage the ground, or the upper holes 47, 48 may be used for shallow draft implements requiring a higher mounting for cam 6. In field operation, the cam 6 is mounted in the preferred mounting position and rotated to adjust the drag arm level so as to allow the spring tines to engage the surface of the ground and penetrate the earth to a desired extent. The entire assembly is pulled forward, usually behind another farm implement such as a disk. The spring tines 26 receive a downward pressure because of the tension exerted by spring 20 and also by reason of the weight of the assembly. This downward force causes the tines 26 to engage and till the soil. Although the spring tines 26 themselves deflect to accommodate small surface rocks and other similar objects, when encountering unusually large objects it is necessary for the entire frame 21 to be able to deflect upwards. By minimizing the additional down pressure exerted on the spring tines during large deflections, their susceptibility to damage is considerably reduced. Moreover, during such deflections of the drag arm, the constraining action of the balance plates on the drag arm prevents undesirable lateral motion of the spring tine assembly. Finally, in addition to the aforesaid features, the present device enables the drag arm to deflect up and down in a vertical plane without slippage of the frame assembly with respect to the drag arm because of the gripping action of the channel section which is clamped between the adjusting frame assembly and the end plate of the drag arm.

It can be seen that the components illustrated in FIGS. 1 to 5 are relatively easy to manufacture and assembly in comparison with many prior units, and constitute a relatively compact and lightweight device.

Other obvious variations, modifications and departures from the specific assembly described above will readily occur to those skilled in the art without departing from the spirit of the invention. The scope of the invention is as set forth in the accompanying claims. In the description and claims, words such as "downward", and "rearward", "underneath", etc. are to be taken in a relative rather than an absolute sense, since obviously the preferred orientation of the trailing arm assembly may vary, depending upon application.

What is claimed is:

1. In a trailing arm mechanism having a support frame, a trailing arm pivotally mounted on the support frame, a frame spring anchoring means fixed to the support frame at a position lower than the pivotal axis of the trailing arm, an arm spring anchoring means fixed to the trailing arm at a position on the underside of the arm remote from the pivotal axis thereof, and a coil spring normally under tension connected between the spring anchoring means, and wherein the support frame comprises a pair of vertical parallel plates one on each side of the trailing arm and closely spaced therefrom and extending rearwardly from the pivotal axis to provide lateral support for the trailing arm; the improvement comprising an adjustable stop element for limiting the downward pivotal movement of the trailing arm, said stop element being rotatably transversely mounted between the parallel plates forwardly of the arm spring anchoring means underneath the trailing arm and having an axis of rotation generally parallel to the pivotal axis of the trailing arm, the stop element having a plurality of abutment surfaces at varying distances from the axis of rotation thereof engageable with the underside of the trailing arm, the stop element being adjustably rotatable and fastenable to the support frame to present any selected one of said abutment surfaces to the trailing arm.

2. The improvement of claim 1, wherein the vertical cross section of the stop element through the abutment surfaces in a plane parallel to the parallel plates is a polygon.

3. The improvement of claim 1, wherein the stop element is an eccentrically mounted rectangular parallelepiped block.

4. The improvement of claim 3, wherein the vertical cross section of the stop element through the abutment surfaces in a plane parallel to the parallel plates is a square.

5. The improvement of claim 4, wherein the parallel plates are provided with a plurality of mounting positions for the stop element, and the stop element is removably selectably mounted in one of said mounting positions.

* * * * *